United States Patent
Immel et al.

(10) Patent No.: US 12,146,482 B2
(45) Date of Patent: Nov. 19, 2024

(54) COMPRESSOR

(71) Applicant: VIESSMANN CLIMATE SOLUTIONS SE, Allendorf (DE)

(72) Inventors: Markus Immel, Gladenbach (DE); Eduard Lang, Allendorf (DE); Lars Kautzner, Marburg (DE)

(73) Assignee: VIESSMANN CLIMATE SOLUTIONS SE, Allendorf (DE)

( * ) Notice: Subject to any disclaimer, the term of this patent is extended or adjusted under 35 U.S.C. 154(b) by 0 days.

(21) Appl. No.: 18/037,797

(22) PCT Filed: Nov. 19, 2021

(86) PCT No.: PCT/DE2021/100918
§ 371 (c)(1),
(2) Date: May 19, 2023

(87) PCT Pub. No.: WO2022/111759
PCT Pub. Date: Jun. 2, 2022

(65) Prior Publication Data
US 2023/0407860 A1    Dec. 21, 2023

(30) Foreign Application Priority Data
Nov. 26, 2020 (DE) .................... 10 2020 131 351.9

(51) Int. Cl.
*F04B 39/12* (2006.01)
*F04B 39/14* (2006.01)

(52) U.S. Cl.
CPC ............ *F04B 39/121* (2013.01); *F04B 39/14* (2013.01)

(58) Field of Classification Search
CPC .. E02D 27/01; E04G 3/18; F24F 1/027; F16B 5/0225; H02K 5/04; F04B 39/121; F04B 39/14
(Continued)

(56) References Cited

U.S. PATENT DOCUMENTS

| 6,053,563 A * | 4/2000 | Edgeller | .................. F01C 21/10 |
| | | | 410/94 |
| 2010/0025179 A1* | 2/2010 | Behrens | .................... F16M 5/00 |
| | | | 192/76 |

(Continued)

FOREIGN PATENT DOCUMENTS

| JP | H10-9685 A | 1/1998 |
| KR | 10-2009-0060930 A | 6/2009 |

OTHER PUBLICATIONS

International Preliminary Report on Patentability and Written Opinion of the International Searching Authority in PCT/DE2021/100918 dated May 30, 2023.

(Continued)

*Primary Examiner* — Alfred J Wujciak
(74) *Attorney, Agent, or Firm* — Collard & Roe, P.C.

(57) ABSTRACT

A compressor includes a compressor housing, a fastening device arranged on the compressor housing, and a support device, connected to the fastening device, for a temperature sensor, the support device being designed to hold, by pressing, the temperature sensor against a wall of the compressor housing. The support device has, for multiple connection to the fastening device, at least two sections, located on different sides of the temperature sensor, wherein, when the compressor is used as intended, the temperature sensor is designed to brace against the compressor housing from below.

9 Claims, 1 Drawing Sheet

(58) Field of Classification Search
USPC .............. 248/671, 672, 674, 678, 676, 680,
248/346.03, 346.04, 346.5, 231.81, 310,
248/316.7
See application file for complete search history.

(56) References Cited

U.S. PATENT DOCUMENTS

| | | |
|---|---|---|
| 2010/0028184 A1 | 2/2010 | Hahn |
| 2012/0121444 A1* | 5/2012 | Anderson ............ A61H 9/0078 |
| | | 417/313 |
| 2014/0353463 A1* | 12/2014 | Ghaisas ................ F16M 11/24 |
| | | 248/346.06 |
| 2016/0102581 A1* | 4/2016 | Del Bono ............... F01D 25/28 |
| | | 415/213.1 |
| 2016/0178290 A1* | 6/2016 | Lim ....................... F16M 11/00 |
| | | 248/678 |
| 2016/0201973 A1* | 7/2016 | Lokhande ............ F25D 23/006 |
| | | 248/678 |

OTHER PUBLICATIONS

International Search Report in PCT/DE2021/100918, mailed Jan. 31, 2022.
Wikipedia, "Thermal conductivity", Last edited Sep. 2, 2020, with English Translation, total of 16 pages, https://de.wikipedia.org/w/index.php?title=W%C3%A4rmeleitf%C3%A4higkeit&oldid=203331633.

* cited by examiner

COMPRESSOR

CROSS REFERENCE TO RELATED APPLICATIONS

This application is the National Stage of PCT/DE2021/100918 filed on Nov. 19, 2021, which claims priority under 35 U.S.C. § 119 of German Application No. 10 2020 131 351.9 filed on Nov. 26, 2020, the disclosure of which is incorporated by reference. The international application under PCT article 21(2) was not published in English.

The invention relates to a compressor as disclosed herein.

A compressor of the type mentioned in the introduction is disclosed in the document JP 10009685 A. This compressor consists of a compressor housing, a fastening device arranged on the compressor housing, and a support device connected to the fastening device for a temperature sensor, wherein the support device is designed to press the temperature sensor against a wall of the compressor housing. The aforementioned fastening device serves in this case, and namely here and also in the solution according to the invention to be explained below in more detail, for the vibration-damped fastening of the compressor, for example, to a frame structure or housing structure of a heat pump. The aforementioned temperature sensor serves for detecting the temperature of the oil located in the compressor. This temperature sensor, i.e. the sensor, is pressed by means of the aforementioned support device, and this also applies to the solution according to the invention, against a wall of the compressor and namely where the oil collects in the compressor, i.e. in the so-called oil collection region which is naturally located, when the compressor is used as intended, at the lower end thereof as a result of gravitational force.

The object of the invention is to improve a compressor of the type mentioned in the introduction. In particular, a compressor is designed to be provided in which the arrangement of the temperature sensor, on the one hand, leads to measurement results which are as accurate as possible and, on the other hand, can be implemented in a manner which is as reproducible as possible, namely the assembly process—in particular when replacing the temperature sensor—always leads to exactly the same contact results between the wall and the sensor.

This object is achieved with a compressor of the type mentioned in the introduction and disclosed herein.

According to the invention, it is thus provided that the support device has at least two sections located on different sides of the temperature sensor, for repeated connection to the fastening device, wherein, when the compressor is used as intended, the temperature sensor is designed to be braced against the compressor housing from below.

In other words, the solution according to the invention is characterized in that the support device is not only designed on one side—as in the prior art mentioned in the introduction—and in this regard to a certain extent in an undefined manner, but is connected to the fastening device via at least two sections spaced apart from one another, which leads to the temperature sensor being designed to be pressed or braced against the wall of the compressor with a pretensioning which is accurately provided. In this case, which is discussed in more detail below, it is also provided that, when the compressor is used as intended, the temperature sensor is designed to be braced from below against the wall forming the base of the compressor.

Other advantageous developments of the compressor according to the invention are also disclosed.

For the sake of completeness, reference is also made to the document US 2010/0028184 A1 in which the temperature sensor, however, is arranged on the top of the compressor housing.

The compressor according to the invention, including its advantageous developments disclosed herein.

In which

Figure 1:
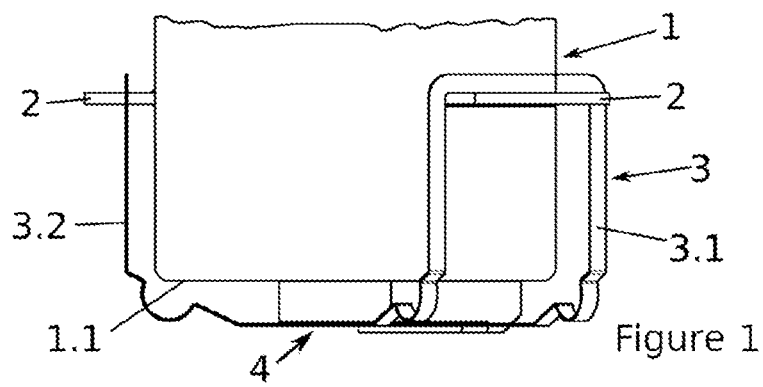
FIG. 1 shows the compressor with a support device according to a first exemplary embodiment in a side view.

The compressor according to the invention consists of a compressor housing 1, a fastening device 2 arranged on the compressor housing 1, and a support device 3 connected to the fastening device 2 for a temperature sensor 4, wherein the support device 3 is designed to press the temperature sensor 4 against a wall 1.1 of the compressor housing 1, see FIG. 1.

It is thus essential for the compressor according to the invention that the support device 3 has at least two sections 3.1, 3.2 located on different sides of the temperature sensor 4, for repeated connection to the fastening device 2, wherein, when the compressor is used as intended, the temperature sensor 4 is designed to be braced against the compressor housing 1 from below, see FIGS. 1 to 4.

In this case, it is preferred that the fastening device 2 is designed in the form of at least two, preferably three, lugs which protrude from the compressor housing 1 and which are arranged to be distributed over the periphery thereof.

It is also preferred, when the compressor is used as intended, that the temperature sensor 4 is preferably designed to be braced against the compressor housing 1 from below, preferably against the wall 1.1 forming a base of the compressor, by means of the sections 3.1, 3.2 which run at least partially above the fastening device 2. In this manner, the position of the temperature sensor 4 on the compressor housing 1 is clearly defined and leads to reproducible and comparable measurement results.

The support device 3 is preferably also designed to be suspended on the fastening device 2. Similarly, it is preferred, when the compressor is used as intended, that the fastening device 2 is arranged above the temperature sensor 4. This permits a particularly simple assembly of the support device 3 on the compressor.

Figure 2:
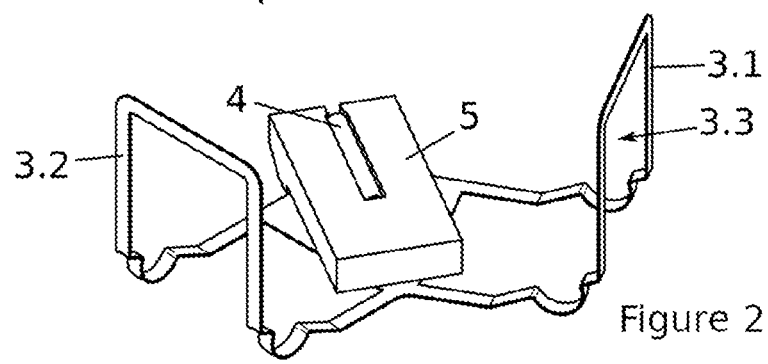
FIG. 2 shows the support device of the compressor according to FIG. 1 in perspective.

It is also preferred that the support device 3 is designed to be stamped from a metal sheet and to be produced by re-shaping, see FIGS. 1 and 2. Alternatively, it is preferred that the support device 3 is designed to be produced from wire, see FIGS. 3 and 4. In these cases, therefore, the support device can be produced particularly simply and cost-effectively, but without losing its effectiveness.

Figure 3:
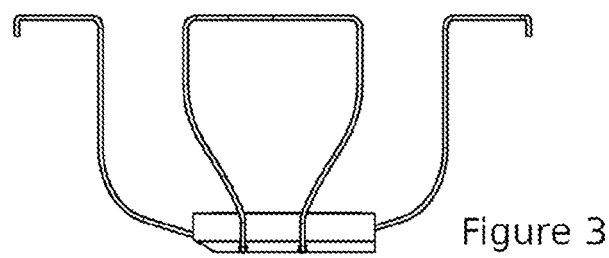
FIG. 3 shows the support device of the compressor according to a second exemplary embodiment.
Figure 4:
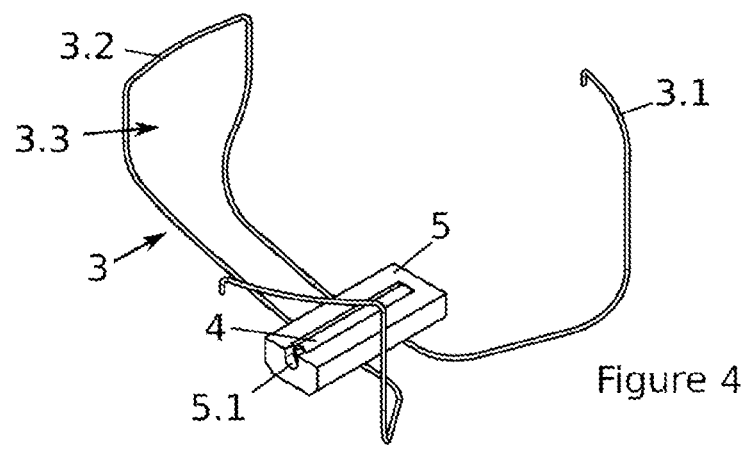
FIG. 4 shows the support device of the compressor according to FIG. 3 in perspective.

Additionally, regarding the construction of the support device 3 it is preferably provided that at least one of the sections 3.1, 3.2 has an opening 3.3 for receiving the fastening device 2 (see FIGS. 1 to 4) and/or that at least one of the sections 3.1, 3.2 is designed as a hook which is open on one side (see FIGS. 3 and 4). Moreover, it is preferred that the sections 3.1, 3.2 are designed as free end sections of the support device 3. It is also preferred, when the compressor is used as intended, that the sections 3.1, 3.2 are designed to run horizontally on the contact region with the fastening device 2. This permits an effective hold of the support device 3 on the fastening device 2 and prevents the support device 3 from slipping off.

It is also preferred that the temperature sensor 4 is designed to be bar-shaped. Additionally, the temperature sensor 4 is preferably designed to be fastened by a receiving element 5 to the support device 3. In this case, the receiving element 5 preferably has a receiving slot 5.1 for the temperature sensor 4, the receiving slot being adapted to the shape of the temperature sensor 4 and being open toward the wall 1.1. The measure that the receiving slot 5.1 is open toward the wall 1.1 makes it possible for the temperature sensor 4 to bear directly, i.e. without an intermediate space, against the compressor housing 1, which in turn improves the temperature measurement. In this case, the receiver element 5 is preferably formed from a material with a thermal conductivity of less than 0.1 W/(mK), in particular from plastics. In this regard, see also https://de.wikipedia.org/w/index.php?title=W%C3%A4rmeleitf%C3%A4higkeit&oldid=203331633.

It should also be mentioned that the above measure, namely that the support device 3 is to be connected to the fastening device 2, not only describes compressors in which the support device 3 is positioned partially on the fastening device 2 as shown in the figures. Embodiments are also encompassed thereby in which the support device 3 and the fastening device 2 are designed to be connected together by a connecting element, such as for example screws or bolts.

The compressor according to the invention according to the exemplary embodiment of FIGS. 1 and 2 functions as follows:

Initially the temperature sensor 4 is inserted into the receiving slot 5.1 of the receiving element 5. Now the support device 3, on which the receiving element 5 is located, is pulled with its sections 3.1 and 3.2 over the fastening device 2 such that the tabs of the fastening device 2 come to rest in the openings 3.3 of the support device 3 and the temperature sensor 4 comes into contact with the wall 1.1 of the compressor housing 1. In this manner, each time the carrier element 4 is assembled, the temperature sensor 4 is automatically fitted in the correct position on the compressor housing 1 and can deliver reliable measurement results. Additionally, this effect is ensured by the use of a carrier element 4 which can be produced simply and cost-effectively.

LIST OF REFERENCE SIGNS

1 Compressor housing
1.1 Wall
2 Fastening device
3 Support device
3.1 Section
3.2 Section
3.3 Opening
4 Temperature sensor
5 Receiving element
5.1 Receiving slot

The invention claimed is:

1. A compressor comprising:
a compressor housing,
a fastening device arranged on the compressor housing, and
a support device connected to the fastening device,
wherein the support device is designed to press a temperature sensor disposed in a receiving element against a wall of the compressor housing,
wherein the support device has at least two sections located on different sides of the temperature sensor which form multiple connections to the fastening device, and
wherein, when the compressor is used as intended, the temperature sensor is designed to be braced against a bottom of the compressor housing.

2. The compressor according to claim 1,
Wherein the support device is designed to be suspended on the fastening device.

3. The compressor according to claim 1,
wherein, when the compressor is used as intended, the fastening device is arranged above the temperature sensor.

4. The compressor according to claim 1, wherein the support device is designed to be stamped from a metal sheet and to be produced by re-shaping.

5. The compressor according to claim 1, wherein the support device is designed to be produced from wire.

6. The compressor according to claim 1, wherein at least one of the sections has an opening for receiving the fastening device.

7. The compressor according to claim 1, wherein at least one of the sections is designed as a hook which is open on one side.

8. The compressor according to claim 1, wherein the temperature sensor is designed to be fastened by the receiving element to the support device.

9. The compressor according to claim 8, wherein the receiving element has a receiving slot for the temperature sensor, the receiving slot being adapted to a shape of the temperature sensor and being open toward the wall.

* * * * *